Figure 1:
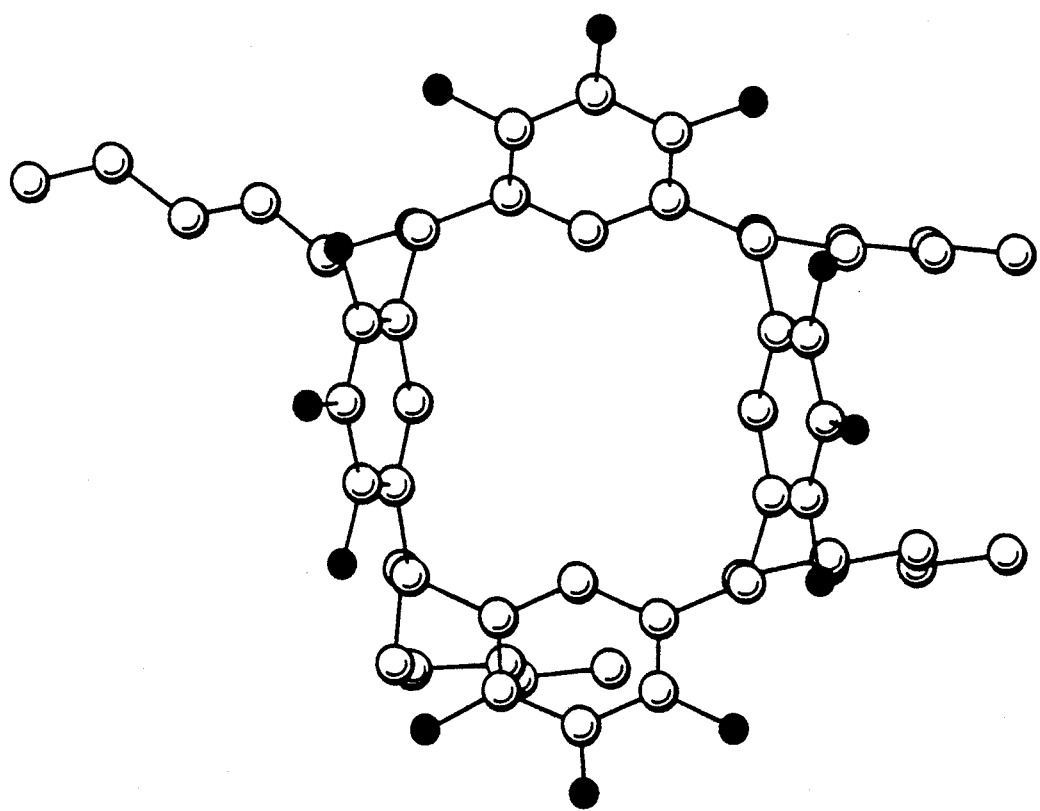

United States Patent [19]

Holmes et al.

[11] Patent Number: 5,169,991

[45] Date of Patent: Dec. 8, 1992

[54] COMPOUND

[75] Inventors: Jeremy M. Holmes, Prestwich; Peter A. Tasker, Dobcross, both of Great Britain

[73] Assignee: Imperial Chemicals Industries PLC, Wilmington, Del.

[21] Appl. No.: 486,671

[22] Filed: Feb. 28, 1990

[30] Foreign Application Priority Data

Mar. 16, 1989 [GB] United Kingdom ............... 8906031

[51] Int. Cl.$^5$ .................... C07C 255/36; C07C 39/17; C07C 39/19; C07C 39/18
[52] U.S. Cl. .................................. 568/720; 558/409; 558/410; 558/427; 568/723; 568/719
[58] Field of Search ............... 568/720, 723, 719; 558/409, 410, 427

[56] References Cited

U.S. PATENT DOCUMENTS 3,702,893  11/1972  Fuchsman .................. 568/723 X
4,614,826   9/1986  Katayama et al. ........... 568/720 X

FOREIGN PATENT DOCUMENTS 0054258   6/1982  European Pat. Off. .
0175480  10/1984  Japan ........................ 568/720
2045546   2/1987  Japan ........................ 568/720

OTHER PUBLICATIONS

C.A., 76, (1972), 4469b, Maijs et al.
Patent Abstracts of Japan, 7, No. 161, (1983), of JP-A-58-69265.
Database, WPi=AIX 74-76738v, Derwent (1974), of JP-B-49037192 (Ube).
Beer et al., J. of Organometallic Chem., 376, (1989), pp. C11-C14.
Kingzett's Chemical Encyclopedia, 9th Ed.; (Hey, D. H., Ed.), p. 18, (1966), Balliere, Tindall and Cassell, London.

*Primary Examiner*—Joseph Paul Brust
*Attorney, Agent, or Firm*—William E. Dickheiser; Paul L. Sharer

[57] ABSTRACT

A compound is a condensate of 1,2,3-trihydroxybenzene with an aldehyde. The condensate is a macrocyclic compound such as a cyclic tetramer. The aldehyde is preferably a long-chain aldehyde such as hexanal, dodecanal or tetradecanal. The condensate can be used as an anti-wear additive in hydrocarbon liquids such as liquid paraffin or as an anti-corrosion additive. The condensate can be prepared by reacting 1,2,3-trihydroxybenzene with an equimolar quantity of an aldehyde in the presence of an acid.

6 Claims, 2 Drawing Sheets

COMPOUND

The present invention relates to a compound, particularly a macrocyclic compound, the preparation of such a compound and the use of the compound in applications requiring surface active characteristics.

Compounds having surface active characteristics typically have a hydrophilic segment and a hydrophobic segment. Compounds of this type are well known and are extensively used in detergents. Compounds having surface active characteristics may be suitable for use in a range of applications including as additives in oils and greases and as components of surface coating compositions. In general compounds of this type are suitable for use in a limited number of applications and compounds having improved characteristics in a particular application or which can be used in a wider range of applications continue to be sought.

According to the present invention there is provided a compound of the formula (I):

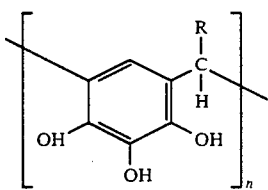

where
R is a hydrocarbyl group or a substituted hydrocarbyl group which contains from 1 up to 24 carbon atoms, and n is an integer.

The group R may be, or may include, an aryl group but it is preferred that R is, or contains, an alkyl group. The group R may be unsaturated, for example as in an alkene or alkyne group and may contain more than one unsaturated bond. The group R may be substituted with substituent groups which typically are hydrocarboxy, acyl, acyloxy (that is an ester group), halogen (for example as in a trifluoromethyl group) or nitrile. It is preferred that R is an unsubstituted alkyl group. The group R preferably contains at least 4, and especially at least 6, alkyl carbon atoms. Typically the group R contains not more than 20 carbon atoms, and especially not more than 14 carbon atoms. Compounds in which the group R contains at least 7 carbon atoms have useful properties.

The value of n is typically at least three and especially is four.

X-ray diffraction studies of crystals of a compound in accordance with the present invention have shown that the —OH groups on the benzene rings are all oriented in the same direction and lie on the same side of the molecule. Each of the groups R is oriented in the same general direction away from the —OH groups.

Figure 2:
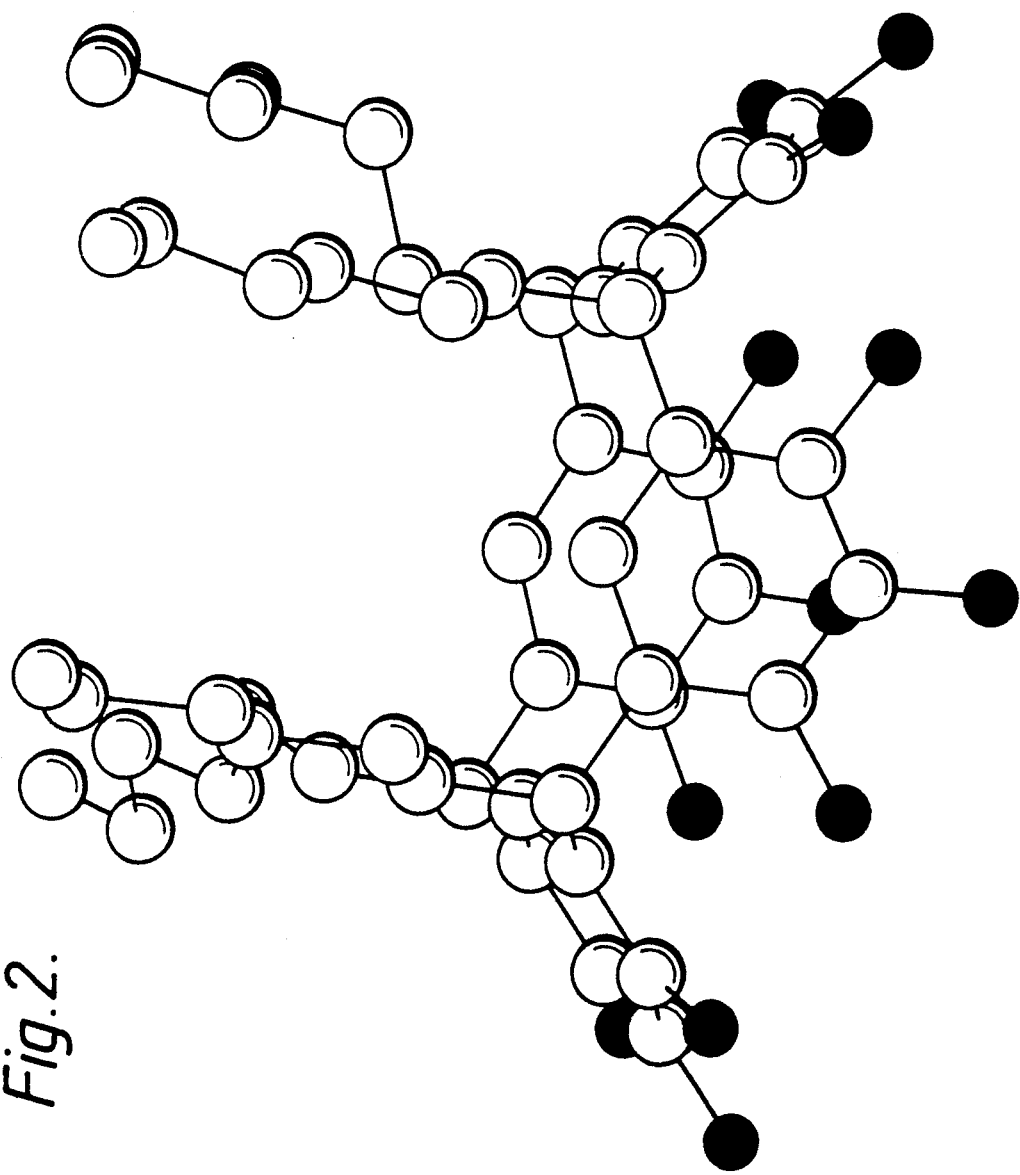

The accompanying drawings show the structure of a compound in accordance with the present invention as deduced by X-ray diffraction and in which each of the groups R is a hexyl group and the value of n is four, wherein FIG. 1 is a plan view of the structure from the direction in which the —OH groups are oriented; and FIG. 2 is a side view from slightly above the plane of the inner great ring.

The compounds of the present invention are typically pale coloured solids. The compounds can be obtained as crystalline materials from which an X-ray diffraction pattern can be obtained. However, the compound is typically obtained as an amorphous material or as a material of low crystallinity.

The solubility of the compounds of the present invention in various solvents is dependant primarily on the nature of the group R. The solubility in non-polar solvents increases as the number of carbon atoms in the group R increases and correspondingly the solubility in polar solvents decreases. Depending on the size of the group R, suitable solvents include methanol, ethanol, acetone, chloroform, toluene and hexane, hydrocarbon solvents, for example aliphatic hydrocarbon solvents such as hexane, being especially suitable for compounds having a large group R, that is compounds in which the group R contains at least 6 carbon atoms.

A crystalline material can be obtained by the slow evaporation of an ethanolic solution of the material, for example by evaporation under conditions of ambient temperature and pressure (about 20° C. and 1000 millebars) for several (at least three) days. The crystalline material can be used to characterise the compound by X-ray diffraction. The compound can be further characterised by infrared absorption, nmr spectrum (proton or $^{13}C$) or by mass spectroscopy. The spectra obtained are consistent with the structure shown in the accompanying drawings.

The compounds of the present invention can be obtained by the reaction of 1,2,3-trihydroxybenzene with the corresponding aldehyde.

More specifically there is provided, as a further aspect of the present invention a process which comprises reacting 1,2,3-trihydroxybenzene with an aldehyde of the general formula RCHO, in the presence of an acid.

The process is preferably effected in the presence of a liquid medium which is a solvent for at least one, and preferably both of the reactants. The liquid medium is preferably a non-solvent for the reaction product. An alkanol is a suitable liquid medium, for example ethanol.

The reaction is preferably effected at an elevated temperature. A suitable reaction temperature is at least 30° C. and may be as high as 120° C. The reaction is conveniently effected at the reflux temperature of the material being used as a liquid medium in which at least one of the reactants is soluble. Using ethanol under reflux conditions the reaction temperature is typically up to 78° C., depending on the concentration of the reactants and acid.

The 1,2,3-trihydroxybenzene and aldehyde are typically reacted together in essentially stoichiometric proportions, particularly from 0.9 to 1.1 moles of 1,2,3-trihydroxybenzene for each mole of aldehyde.

The acid which is present is preferably a strong inorganic acid. However, the presence of oxidising acids should be avoided and hence the acid is preferably a non-oxidising acid such as a hydrogen halide, for example hydrogen chloride. The acid is conveniently used as a concentrated solution, for example concentrated hydrochloric acid, as in an acid having a hydrogen chloride concentration of at least 30% by weight and especially at least 35% by weight.

The acid is typically used in an amount of at least 0.1 moles of acid for each mole of 1,2,3-trihydroxybenzene. We have found that the yield of product can be increased, and the reaction time reduced, if a higher proportion of acid is used. Thus, we prefer to use at least 0.25 moles of acid, and especially at least 1.0 mole of acid, for each mole of 1,2,3-trihydroxybenzene. We have obtained useful results when using 2.5 moles of acid for each mole of 1,2,3-trihydroxybenzene. Higher proportions of acid can be used but no significant advantage is gained by using a large excess of acid and hence it is preferred that the amount of acid does not exceed 10 moles of acid for each mole of 1,2,3-trihydroxybenzene.

The reaction time is dependent on the rate of reaction and this is influenced by the proportion of acid used relative to the 1,2,3-trihydroxybenzene. In general the reaction time is at least one minute and does not exceed 10 hours. The reaction time is typically from 10 minutes to 5 hours and a convenient time is one hour.

We have found that the yield of the compound is dependent on the particular aldehyde used, that is on the nature of the group R. Generally we obtain an improved yield of compound when using an aldehyde in which the group R contains more than 4 carbon atoms.

It is a preferred aspect of the process of the present invention to use an aldehyde of the general formula RCHO in which the group R contains more than 6 carbon atoms.

The reaction can be effected by stirring at elevated temperature for a period of one minute to ten hours, particularly from ten minutes to five hours for example about one hour. During the reaction at elevated temperature, some solid product may separate. However, on cooling the reaction mixture to a temperature in the range 0° C. to 10° C., a solid separates out in considerable quantities. The solid may be separated by filtration and washed with a quantity of the liquid medium in which the reaction was effected. If desired, a further quantity of product may be obtained, as a crystalline solid, by the slow evaporation of the liquid medium from the residual reaction product mixture.

The product may be purified by dissolving in a suitable solvent such as ethanol and allowing the solvent to evaporate slowly to give crystals of the product. However, for many applications it is not necessary to purify the product.

Compounds in accordance with the present invention have one portion which is hydrophilic and a further portion which is hydrophobic. Such compounds are surface active and can be used in a range of applications for which surface active characteristics are desirable.

Thus, the compounds of the present invention may be used as surfactants, as additives to provide corrosion inhibition of a metal surface, for the dispersion of solids in liquids, for example metal particles in paint, or as anti-wear additives to lubricants.

It is a particular aspect of the present invention that the compounds of the present invention provide surface protection properties.

Thus, according to a further aspect of the present invention there is provided a composition which comprises
  a) a liquid solvent or dispersant or a surface coating composition and
  b) a compound of the formula (I)

Component a) of the coating composition may be a liquid in which component b) is dissolved or dispersed. Suitable liquids include aliphatic cycloaliphatic and aromatic hydrocarbons, halogenated hydrocarbons, alcohols, esters and ketones, many of the compounds which are component b) being soluble in such liquids. Alternatively, the liquid can be water in which the compounds which are component b) are generally insoluble and hence, when component a) is water, the composition is generally a dispersion of component b) in water. If a liquid dispersant is used, this may include a suitable surfactant to aid dispersion of component b) in the liquid. Component a) may be a lubricating material such as an oil or a grease, for example liquid paraffin or a synthetic polyalkylene glycol lubricant.

Alternatively, component a) is a surface coating composition, for example a film forming binder system. The film forming binder system which can be used as component (a) of the coating composition may be a paint (primer), a lacquer; a resin or other protective coating. Thus, component (a) may be a solvent-based surface coating composition, for example a cellulose/solvent based primer paint such as those used for car "touch-up" paints. The compound which is component (b) of the coating composition is generally soluble to at least some extent in the solvents used for such primers and typically is added as a solid when being incorporated into such a primer paint system. Alternatively, component (a) may be an aqueous emulsion surface coating system, for example a primer or protective coating based on polymer latices such as for example acrylic and styrene/acrylic latices and vinyl acrylic copolymer latices including acrylate modified vinyl chloride—vinylidene chloride copolymer latices, and the compound which is component (b) may be used as a dispersion or suspension in such aqueous systems. The surface coating composition may be an alkali-removable protective coating composition of the addition polymer type in which the polymer contains carboxyl groups.

The film forming binder system which may be used as component (a) of the composition preferably contains an organic polymer and in general any such polymer used in the paint industry may be included in the composition. Thus, the suitable film forming binders include, for example, an alkyd resin, an epoxy resin, an oleoresin, a latex rubber, a chlorinated rubber, a vinyl resin such as polyvinylacetate or polyvinyl butyral, a polyurethane, a polyester, an organic or inorganic silicate, a polyamide or an acrylic polymer. It will be appreciated that the composition can include two or more compatible film forming polymers. The composition may also include an extender or plasticising resin, such as a hydrocarbon resin, or a coal tar derivative.

The film forming binder system which may be used as component (a) of the coating composition of the present invention can include homopolymers and copolymers of the following:
vinyl chloride,
vinylidene chloride,
Vinyl esters of alkanoic acids having from 1 to 18 carbon atoms in the alkyl group, especially vinyl acetate, alkyl acrylates and methacrylates having from 1 to 18 carbon atoms in the alkyl group,
acrylamide and substituted acrylamides,
acrylonitrile, and methacrylonitrile,
monoethylenically unsaturated hydrocarbons, for example ethylene, isobutene, styrene and alpha-methyl styrene.

Example of polymers usable when component (a) is a film forming binder system are "acrylic polymers", by which is meant those polymers comprising predominantly units of alkyl acrylates and/or methacrylates having from 1 to 12 carbon atoms in the alkyl group, sometimes containing an acid functionally by virtue of containing polymerised units of one or more aliphatic unsaturated alpha-beta unsaturated carboxylic acids.

Polymers of this type are described in European Patent Application No. 0115694.

Other examples of polymers usable when component (a) is a film forming binder system are copolymers of (i) vinyl chloride, (ii) vinylidene chloride and (iii) one or more alkyl acrylates or alkyl methacrylates having from 1 to 12 carbon atoms in the alkyl group; such polymers may optionally also contain polymerised units of one or more aliphatic alpha-beta unsaturated carboxylic acids. Copolymers of this type are described generally and specifically in the specification of UK Patent No. 1558411.

Alkyd containing resins are extensively used as the film forming binder in paint systems and component (a) maybe a film forming binder system which is or contains an alkyd containing resin, for example an oil-modified alkyd.

The polymer or polymers which is, or are, used when component (a) is a film forming binder system, is usually used in an amount of from 5 to 60% (based on weight in grams of the polymers per 100 cm$^3$ of the composition), and more usually 10 to 40%. The polymer may be dissolved or colloidally dispersed (that is exist as an emulsion, with an average particle size usually below two micrometers) in a suitable liquid carrier medium.

Component (a) may be any material which can be contacted with a surface either to provide a coating thereon or to provide lubrication. Thus, component (a) may be a natural oil or natural grease which has been derived from animals or plants, such as, for example, lanolin or rape seed oil. Alternatively, component (a) may be a petroleum refined product such as a lubricating oil, turbine oil, fuel oil, gasoil or grease, which are used in circumstances in which they contact, and coat, if only temporarily, a metal surface.

Component (b) of the coating composition of the further aspect of the present invention is a compound of formula (I), as previously described herein.

The compositions of the further aspect of the present invention, particularly when component (a) is a surface coating composition, can be coated onto a metal and we have found that the coated surface has an increased resistance to corrosion. The compositions are suitable for the corrosion inhibition of iron, zinc, copper, tin and aluminum, particularly mild steel and the zinc surface of a galvanised steel.

The use of the composition of the present invention to provide a corrosion inhibiting coating may be combined with a conventional corrosion inhibition treatment such as, for example, the phosphating of iron. Furthermore, the composition may include, in addition to the condensate, other materials, particularly those which have been proposed as corrosion inhibitors. Thus, the composition may include a metal oxide or as an alternative to, or in addition to, the metal oxide, the composition may also include a metal phosphate, particularly a phosphate of the metal which is present in the metal oxide.

Thus, as a yet further aspect of the present invention the composition of components (a) and (b) may also include at least one of a metal oxide and a metal phosphate.

The composition of the present invention typically contains from 0.1 to 30% by weight of the compound which is component (b) relative to the total volume of the composition and preferably the component (b) is present in an amount of 0.1 to 5% w/w. If component (a) of the composition is an emulsion of a film forming binder system in a liquid medium, the compound which is component (b) may give a useful effect when dispersed in the emulsion in an amount of from 0.1 to 15% w/w. If the composition is a lubricant composition the compound is typically present in such a composition in an amount of from 0.1 up to 10% wt/wt, preferably from 0.5 to 6% wt/wt.

In addition to the compound of the formula (I) and the liquid solvent or dispersant or the surface coating composition, the composition of the present invention may include various other ingredients such as those commonly employed in the film forming coating compositions such as defoamers, rheology control agents, thickeners, dispersing and stabilising agents (usually surfactants), wetting agents, extenders, fungicides, pigments or colorants of one sort or another, coalescing solvents, plasticisers, and anti-freeze agents. Furthermore, as noted previously herein, the composition may also include one or more known corrosion inhibitors.

The composition of the further aspect of the present invention may be prepared using any one of the techniques which have been used for incorporating solids into a liquid or plastic medium in which the solid is essentially insoluble. Thus, if component (a) is a film forming coating composition, techniques for preparing paint compositions may be used, for example by mixing components either in a grinding apparatus or pre-mixing the components and then grinding. The compound of the formula (I) and any optional metal oxide, metal phosphate or other corrosion inhibitor, may be incorporated into the surface coating composition at any convenient stage, for example during the grinding together of the components of the paint formulation.

As noted previously herein, the composition of the present invention may be coated onto a metal to provide a corrosion inhibiting coating on the metal.

Thus, as a yet further aspect of the present invention there is provided a process which comprises coating at least part of a surface of a metal with a composition her hereinbefore defined.

The process of the present invention results in a coated surface which typically has an increased resistance to corrosion and is especially suitable for the corrosion inhibition or iron, zinc, copper, tin and aluminium, particularly mild steel and the zinc surface of a galvanised steel.

The composition may be applied to the metal surface in conventional manner, for example by dipping, spraying or brushing. The temperature of the application may be any suitable temperature for example from 0° to 50° C.

The metal surface which is coated with the composition may be brightly polished and/or freshly cleaned, but a lightly rusted surface may be coated by the process of the present invention. Thus the composition may be coated onto a surface in an "as received" condition, and it may be unnecessary for the surface to be freshly cleaned or brightly polished.

The process of the present invention provides a corrosion inhibiting coating on the surface of a metal and may be combined with conventional corrosion inhibition treatments such as the phosphating of iron.

The process of the present invention may be used to provide corrosion inhibition as a pre-treatment before application of a known surface coating. Thus the coating step may be used, for example, to provide temporary protection whilst the metal is being transferred from one sit to another. Hence the process of the present invention may be used for the temporary protection of a metal surface and the protective coating subsequently removed before or during further processing.

A metal surface coated in accordance with the process which is a further feature if the present invention has an improved resistance to corrosion.

Thus, as a yet further feature of the present invention there is provided a metal article, at least part of one surface of which has a coating which is a compound of the formula (I) or which is a composition as hereinbefore described and which contains a compound of the formula (I).

The surface of the metal may be coated with a composition which contains the compound of the formula (I) and a known corrosion inhibitor.

It is a particular feature of the present invention that the compounds of the formula (I) in accordance with the present invention give improved anti-wear characteristics when incorporated into an oil or grease which is in contact with moving metal surfaces.

Thus, according to a yet further aspect of the present invention there is provided a lubricant composition comprising an oil or grease and a compound in accordance with the present invention.

The compound of the present invention is typically present in the lubricant composition in an amount of from 0.1 up to 10% wt/wt, and preferably from 0.5 up to 6% wt/wt.

We have found that incorporating the compounds of the present invention into a lubricant gives a reduced amount of wear compared to the same lubricant containing nfo additive or one containing ethyl laurate or diethyl-n-decylmalonate (both of which are disclosed as giving reduced wear in Lubrication Engineering, Volume 43 (1987) pages 717 to 722) and the commercially available anti-wear additive zinc dialkyldithiophospate.

The various aspects of the present invention are described in more detail in the following illustrative Examples.

EXAMPLE 1

Five grammes (0.04 mol) of 1,2,3-trihydroxybenzene were dissolved in 40 cm$^3$ of ethanol at ambient temperature (15°-20° C.). The solution was stirred and 7.35 grammes (0.04 mol) of dodecyl aldehyde ($C_{11}H_{23}$CHO— that is an aldehyde in which the group R is undecyl) were added to the solution followed by 10 cm$^3$ of concentrated hydrochloric acid (37% by weight hydrogen chloride in water). The solution was initially clear but became cloudy on the addition of the acid.

The mixture was stirred and heated up to reflux temperature (about 78° C.). The solution became clear. The solution was maintained at reflux temperature for one hour. The colour of the solution was observed to change from pale orange to a blood red/orange.

The mixture was then cooled in an ice-bath (0° C.) whilst stirring rapidly. A pale pink coloured solid precipitated copiously. The precipitated solid was collected by filtration and washed with a minimum (about 3-5 cm$^3$) of cold (about 0° C.) ethanol. The solid was then dried at ambient temperature (15°-20° C.) and a pressure of 14 mm of mercury for about 17 hours.

A yield of 6.46 grammes was obtained, which represented a yield of 55% for the product [$C_6H(OH)_3$ $CH(C_{11}H_{23})]_4$ based on the reactants.

The product obtained showed peaks in the infra red spectrum at 3340 cm$^{-1}$ and 3467 cm$^{-1}$, these being characteristic of OH groups and also at 874 cm$^{-1}$ and 1617 cm$^{-1}$, these being characteristic of an aryl group.

The product was also subjected to proton nmr using a Bruker WM 250 MHz spectrometer with CDCl$_3$ as a solvent and tetramethylsilane as a standard.

The shifts noted are set out in Table One, together with the groups responsible for the shift observed.

TABLE ONE

| SHIFT (ppm) | TYPE | GROUP (ppm) |
|---|---|---|
| 8.8 | singlet hydrogen | H in OH group. |
| 7.5 | singlet hydrogen | H in aryl group. |
| 6.8 | broad singlet, hydrogen | H in 2 OH group. |
| 4.4 | triplet, hydrogen | H in group —Ar—CHR—AR— |
| 2.2 | broad singlet, hydrogen | H in methylene group of the group Ar$_2$CH—CH$_2$—R$^1$. |
| 1.3 | multiplet, hydrogen | H in alkyl chain —(CH$_2$—)$_n$—. |
| 0.85 | triplet, hydrogen | H in CH$_3$ at end of alkyl chain. |

Further investigation of the product was effected by proton decoupled $^{13}$C nmr using the same spectrometer with CDCl$_3$ as a solvent and tetramethylsilane as a standard. The shifts noted were compatible with a compound containing aromatic and methylene carbon atoms and are noted in Table Two.

The mass spectrum of the product was consistent with the cyclic tetrameric structure. Additionally analysis for C and H content was also consistent with the structure.

TABLE TWO

| Shift (ppm) | Group |
|---|---|
| 138.6 | Carbon in aromatic ring |
| 137.5 | |
| 131.5 | |
| 125.5 | |
| 124.2 | |
| 113.9 | |
| 58.1 | C in Ar$_2$CHR |
| 34.2 | Carbon in alkyl chain |
| 33.2 | |
| 32.1 | |
| 29.8 | |
| 29.5 | |
| 29.0 | |
| 28.3 | |
| 22.8 | |
| 18.2 | Carbon of methyl group at |
| 14.1 | end of alkyl chain |

EXAMPLES 2 TO 11

The process of Example 1 was repeated with the exception that the aldehyde was replaced by an equal molecular proportion of aldehydes of the formula RCHO, in which R is an alkyl group. The aldehyde used, and the % yield obtained, are set out in Table Three.

TABLE THREE

| Example | Aldehyde (Catoms in R) | Yield (%) |
|---|---|---|
| 2 | 1 | 32 |
| 3 | 2 | 7 |
| 4 | 3 | 21 |
| 5 | 4 | 26 |
| 6 | 5 | 43 |

TABLE THREE-continued

| Example | Aldehyde (Catoms in R) | Yield (%) |
| --- | --- | --- |
| 7 | 6 | 20 |
| 8 | 7 | 64 |
| 9 | 8 | 70 |
| 10 | 10 | 50 |
| 1 | 11 | 55 |
| 11 | 13 | 59 |

The mother liquors from the preparation of Example 7 (R is $C_6H_{13}$) were concentrated by slow evaporation at ambient temperature and pressure for seven days. Crystals were obtained. The crystals were subjected to structural analysis by X-ray diffraction. From the X-ray diffraction pattern the structure of the compound was deduced to be as shown in accompanying FIGS. 1 and 2.

FIG. 1 is a plan view showing four aromatic rings with the hydroxyl groups all lying on the same side of the molecule and with a hexyl group attached to each of the bridging methylene groups, the first carbon atom in the hexyl group being obscured by the bridging methylene group.

FIG. 2 is a side view from slightly above the plane of the inner great ring. It will be appreciated that, as in FIG. 1, not all of the atoms and bonds are visible. In both of the figures, only the carbon and oxygen atoms are shown, the oxygen atoms being the solid circles.

EXAMPLE 12

The procedure of Example 1 was repeated with the exception that 20 cm$^n$ of the concentrated hydrochloric acid was used.

7.29 g of product were obtained which corresponded to a yield of 63% based on the reactants.

EXAMPLE 13

The procedure of Example 1 was repeated with the exception that 1 cm$^n$ of the concentrated hydrochloric acid was used and the mixture was maintained at reflux temperture for four hours.

6.77 g of product were obtained which corresponded to a yield of 58% based on the reactants.

EXAMPLES 14 TO 21

The compounds of Examples 1 and 11 were tested as anti-wear additives in liquid paraffin. The tests were carried out using a cross-cylinders configuration using a procedure generally as described in Lubrication Engineering, Volume 43 (1987) pages 717 to 722. The test duration was five minutes.

A steel cylinder of 62.1 mm diameter and formed from EN 26 steel was rotated against an aluminium cylinder of 16.25 mm diameter using a sliding speed of 0.4 m.s$^{-1}$. A load of 49.1N was applied.

Further tests were carried out using ethyl dodecanoate and diethyl n-decylmalonate, compounds disclosed for this purpose in Lubrication Engineering, Volume 43 (1987) pages 717 to 722. The type of additive, the concentration of the additive and the amount of wear are set out in Table Four.

TABLE FOUR

| Example or Comp. Ex. | Additive (a) | | Wear Scar (b) | |
| --- | --- | --- | --- | --- |
| | Type | (%) | Area (mm$^2$) | Volume (mm$^n$) |
| A | EL | 5 | 6.35 | 0.270 |
| B | DEDM | 5 | 5.35 | 0.191 |
| 14 | 1 | 5 | 4.14 | 0.115 |
| 15 | 11 | 5 | 3.82 | 0.097 |
| C | NIL | NIL | 5.05 | 0.171 |
| 16 | 1 | 1 | 3.73 | 0.093 |
| 17 | 1 | 2 | 3.49 | 0.082 |
| 18 | 1 | 5 | 4.36 | 0.127 |
| 19 | 11 | 1 | 3.34 | 0.074 |
| 20 | 11 | 2 | 3.61 | 0.087 |
| 21 | 11 | 5 | 2.91 | 0.057 |

EXAMPLES 22 TO 25

The procedure of Examples 14 to 21 was repeated using the products of Examples 1 and 11 and also zinc dialkyldithiophosphate, a commercially available anti-wear additive. The conditions used, and the results obtained, are set out in Table Five, all results being an average result of three tests.

TABLE FIVE

| Example or Comp. Ex. | Additive (a) (c) | | Wear Scar (b) | |
| --- | --- | --- | --- | --- |
| | Type | (%) | Area (mm$^2$) | Volume (mm$^n$) |
| 22 | 1 | 1 | 2.27 | 0.036 |
| 23 | 1 | 2 | 1.78 | 0.021 |
| 24 | 11 | 1 | 1.96 | 0.026 |
| 25 | 11 | 2 | 1.64 | 0.018 |
| D | ZDDP | 1.5 | 2.19 | 0.032 |

EXAMPLE 26

The product of Example 11 (R is $C_{13}H_{27}$) was subjected to a modified Salensky Test (please give appropriate reference-either ASTM or similar or literature) as described hereafter. (The Salensky Test is described on pages 236 to 266 of "Corrosion Control by Organic Coatings" edited by Henry Leidheiser Jnr., and published in 1981 by NACE).

1.32 g of the product of Example 11 were added to 58.68 g of diphenylether. 30 g of 3 mm glass beads were added and the mixture was shaken using a paint conditioner manufactured by the Red Devil Manufacturing Company (Model 5410) for 30 minutes. 10 cm$^3$ of this mill base was added to a 1 oz (28.35 g) bottle containing an accurately weighed, freshly cleaned, steel coupon, 2.5 cm square. The coupon was suspended (half immersed) in the mill base and 2 cm$^3$ of a 3% w/v solution of sodium chloride in water were added. The mixture was then shaken at 40+2° C. for 24 hours. The steel coupon was then removed, cleaned and reweighed to obtain the weight loss due to corrosion. This procedure was repeated several times, to obtain an average weight loss. For comparison further experiments were carried out excluding the condensate or in which the condensate was replaced by the same weight of zinc phosphate.

The results obtained are set out in Table Six.

TABLE SIX

| Example or Comp Ex | Additive (a) | DP (%) (e) |
| --- | --- | --- |
| 26 | 11 | 92 |

TABLE SIX-continued

| Example or Comp Ex | Additive (a) | DP (%) (e) |
|---|---|---|
| E | Z P | 77 |

Notes to Table Six
(a) is as defined in Notes to Table Four.
(d) Z P is zinc phosphate PZ 40 from Societe Nouvelle des Coulers Zinciques.
(e) Degree of protection (DP) is given by the relationship:

$$DP = 100\left(1 - \frac{\text{wt loss with additive}}{\text{wt loss with no additive}}\right)$$

We claim:

1. A cyclic compound of the formula

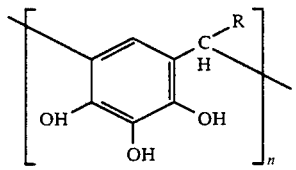

wherein
R is an alkyl or aryl group containing up to 24 carbon atoms, an alkene or alkyne group containing 4 to 24 carbon atoms, a substituted alkyl or aryl groups containing up to 24 carbon atoms, or a substituted alkene or alkyne containing 4 to 24 carbon atoms; wherein the substituent group is a halogen or nitrile group; and
n is three or four.

2. A cyclic compound of the formula

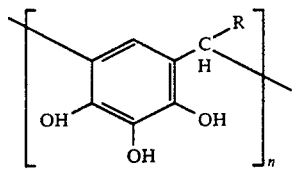

wherein
R is an alkyl or aryl group containing up to 24 carbon atoms, or an alkene or alkyne group containing 4 to 24 carbon atoms; and
n is three or four.

3. A cyclic compound of the formula

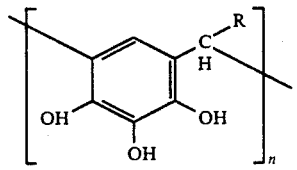

wherein
R is a $C_4$–$C_{14}$ alkyl group; and
n is three or four.

4. A cyclic compound of the formula

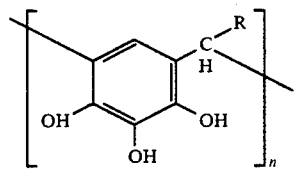

wherein
R is alkene or alkyne; and
n is three or four.

5. A compound in accordance with claim 3 wherein R is $C_{11}$ alkyl and n is 4.

6. The compound of claim 4 wherein R is alkene.

* * * * *